US007548181B1

(12) United States Patent
Bausov

(10) Patent No.: US 7,548,181 B1
(45) Date of Patent: Jun. 16, 2009

(54) EARTH-PENETRATING RADAR WITH INHERENT NEAR-FIELD REJECTION

(75) Inventor: Igor Bausov, Raton, NM (US)

(73) Assignee: Stolar, Inc., Raton, NM (US)

( * ) Notice: Subject to any disclaimer, the term of this patent is extended or adjusted under 35 U.S.C. 154(b) by 135 days.

(21) Appl. No.: 11/478,757

(22) Filed: Jun. 29, 2006

(51) Int. Cl.
*G01V 3/12* (2006.01)
*G01S 13/89* (2006.01)
*G01S 13/32* (2006.01)
(52) U.S. Cl. .................... 342/22; 342/179; 342/129; 342/159
(58) Field of Classification Search ............ 342/22, 342/90, 129, 159, 175, 179, 195
See application file for complete search history.

(56) References Cited

U.S. PATENT DOCUMENTS 6,664,914 B2* 12/2003 Longstaff et al. ............ 342/22
6,765,527 B2* 7/2004 Jablonski et al. ............ 342/193
7,307,575 B2* 12/2007 Zemany ....................... 342/22
7,313,199 B2* 12/2007 Gupta et al. ................. 375/297
2007/0013578 A1* 1/2007 Iritani et al. ................. 342/118

OTHER PUBLICATIONS

Remote Sensing by Radar Jakob J. van Zyl, Yunjin Kim Wiley Encylopedia of Electrical and Electronics Engineering Published online: Dec. 27, 1999.*

* cited by examiner

*Primary Examiner*—Thomas H Tarcza
*Assistant Examiner*—Cassi Galt
(74) *Attorney, Agent, or Firm*—Richard B. Main

(57) ABSTRACT

A ground-penetrating radar comprises a transmitter for launching pairs of widely separated and coherent continuous waves. Each pair is separated by a different amount, such as 10 MHz, 20 MHz, and 30 MHz. These are equivalent to modulation that have a phase range that starts at 0-degrees at the transmitter antenna which is near the ground surface. Deep reflectors at 90-degrees and 270-degrees will be illuminated with modulation signal peaks. Quadrature detection, mixing, and down-conversion result in 0-degree and 180-degree reflections effectively dropping out in demodulation.

5 Claims, 3 Drawing Sheets

EARTH-PENETRATING RADAR WITH INHERENT NEAR-FIELD REJECTION

FIELD OF THE INVENTION

Figure 1:
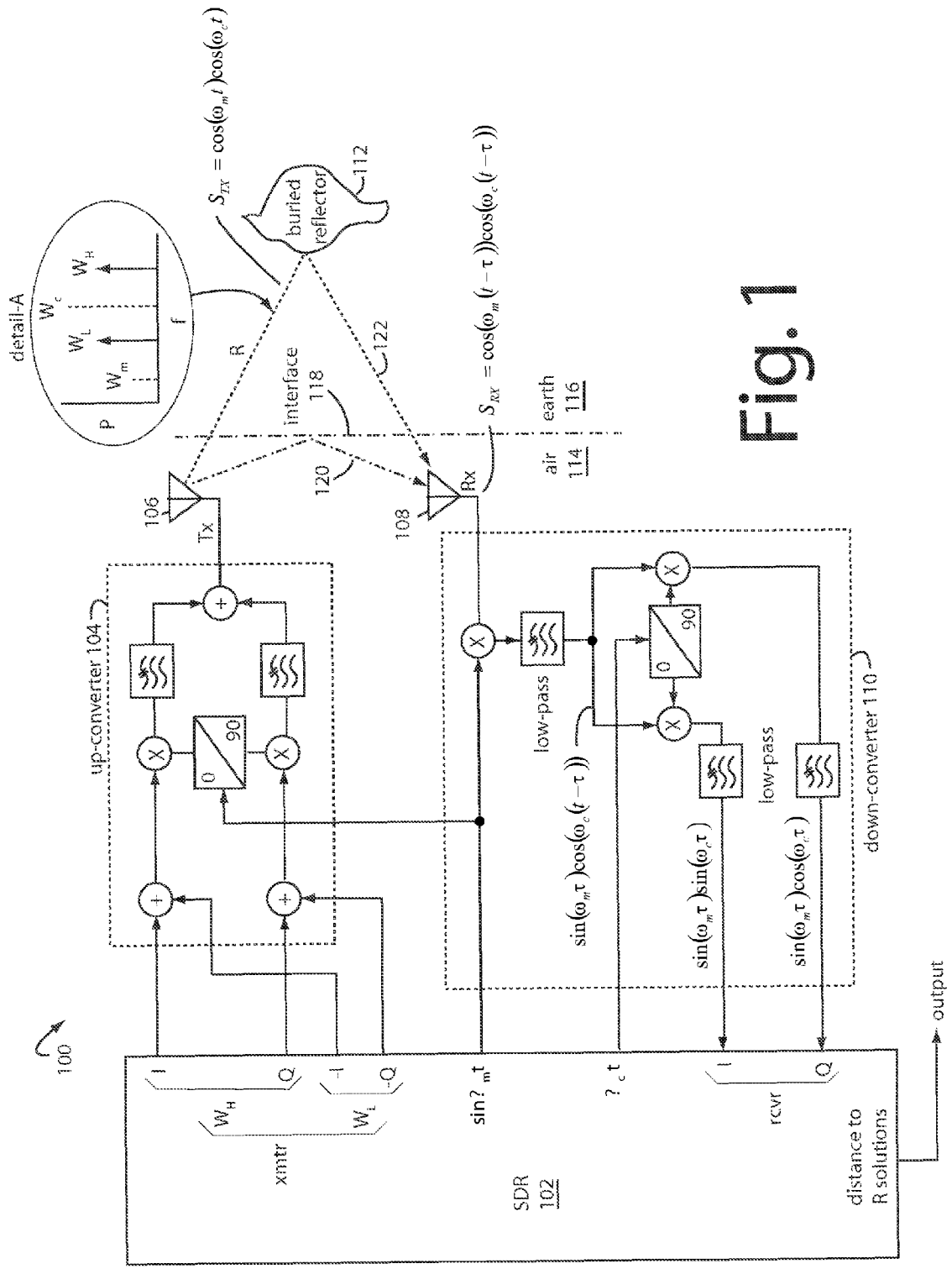

The present invention relates to ground penetrating radars, and more particularly to radars that are able to completely suppress media interface reflections occurring very close at the air-ground interface.

DESCRIPTION OF THE PRIOR ART

Earth-penetrating radars have been studied and applied by Stolar Horizon (Raton, N. Mex.) to coal mining and automated mining safety devices. Conventional radars typically send out a radio pulse, and an echo will typically be returned by any objects with a contrast in their dielectric constant values. The time the echo takes to return is proportional to the distance the objects are from the radar antenna. Unfortunately for earth penetrating radars, a big echo reflection occurs at the adjacent interface of air and earth. The echo can be strong enough to swamp the echoes returning from deeper, smaller objects of interest. Burying the antenna or contacting the surface are very often not practical.

Frequency sweeping radars have an advantage in some applications. The transmitted frequency is swept according to a time schedule. Any return echoes will have different frequencies that represent the time at which the original signals left the transmitter. Subtracting the current time results in a measurement that is proportional to the objects' distances from the antenna. Tunable reject filters on the receiver can be used to suppress echoes from the air-earth interface.

Earth-penetrating radars have many practical and useful applications, especially in the military to find and locate bombs, landmines, weapons caches, and other threats. In coal mining, earth-penetrating radars are useful in directional drilling and in continuous mining machines to guide automation through the coal seams and to avoid hazards and other problems.

Stolar Horizon has made a business out of using electromagnetic (EM) wave gradiometers to image deep into the earth to characterize coal deposits, anomalies, and to locate underground man-made facilities and installations. Such technology has depended on illuminating the ground with a continuous primary EM wave of 80 KHz to 1 MHz, and sensing the reflected secondary EM waves with phase and amplitude information. Others have used more traditional radars that send out pulses and measure the echo returns. But all these suffer from strong reflections at the ground that can swamp the receiver and bury the echo signals deep in the noise floor.

What is needed is a fundamentally different approach that will naturally reject the surface reflections and that will allow more gain to be used to image the echo signals better.

SUMMARY OF THE INVENTION

Briefly, a ground-penetrating radar embodiment of the present invention comprises a transmitter for launching pairs of widely separated and coherent continuous waves. Each pair is separated by a different amount, such as 10 MHz, 20 MHz, and 30 MHz. These are equivalent to modulation that have a phase range that starts at 0-degrees at the transmitter antenna which is near the ground surface. Deep reflectors at 90-degrees and 270-degrees will be illuminated with modulation signal peaks. Quadrature detection, mixing, and down-conversion result in 0-degree and 180-degree reflections effectively dropping out in demodulation.

An advantage of the present invention is that a radar is provided for efficient earth-penetrating imaging.

Another advantage of the present invention is that a ground-penetrating radar is provided that allows gain to be increased because unwanted signals from near reflections are zeroed out in demodulation.

These and other objects and advantages of the present invention will no doubt become obvious to those of ordinary skill in the art after having read the following detailed description of the preferred embodiments which are illustrated in the various drawing figures.

IN THE DRAWINGS

Figure 2:
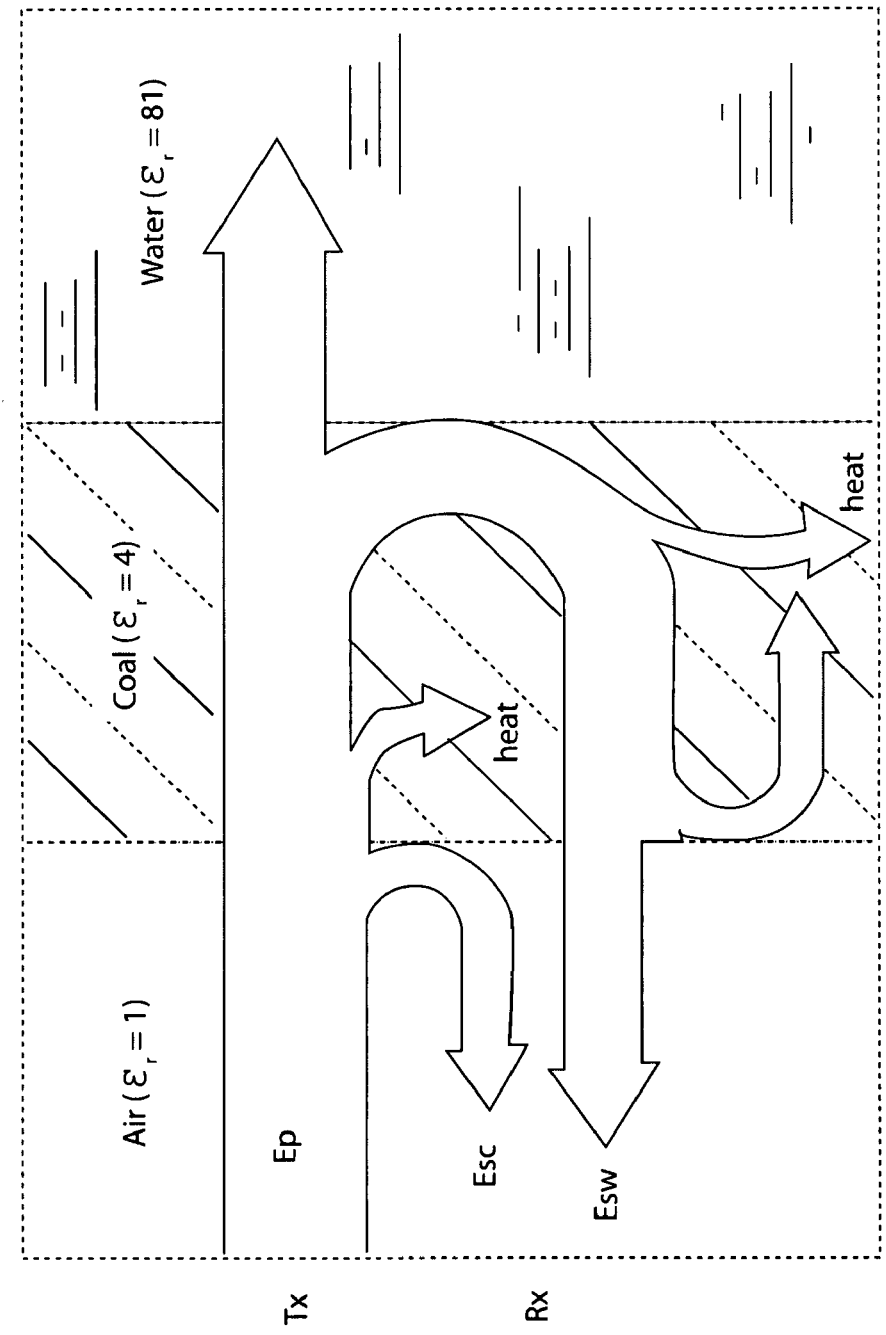
Figure 3:
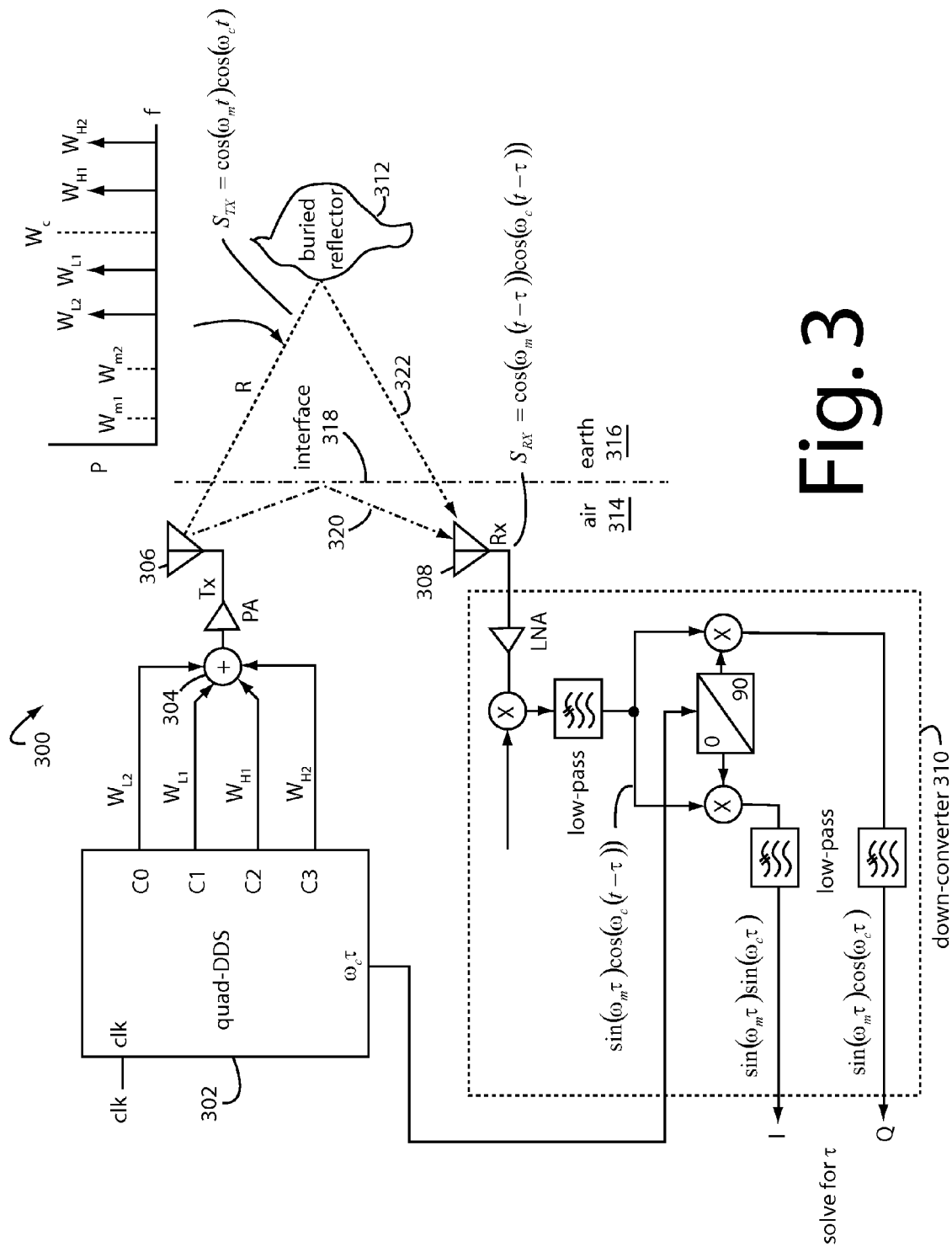

FIG. 1 is a functional block diagram of earth-penetrating radar embodiment of the present invention with one pair of coherent transmitter frequencies to help describe the basic theory of modulation radar used here;

FIG. 2 is a diagram showing the primary EM waves entering a coal seam from the atmosphere and the reflections and losses that occur at the air-coal and coal-water interfaces where the dielectric constants will contrast; and FIG. 3 is a functional block diagram of multi-pair transmission earth-penetrating radar embodiment of the present invention with two pairs of coherent transmitter frequencies generated by direct digital synthesis, and to illustrate how at least five such pairs would be used in a practical implementation.

DETAILED DESCRIPTION OF THE PREFERRED EMBODIMENT

FIG. 1 illustrates a radar embodiment of the present invention, and is referred to herein by the general reference numeral 100. The challenges in design are two fold, how to generate widely separated coherent frequencies, and how to transmit the two widely separated signals with equal amplitudes. Radar 100 does both by using software defined radio (SDR) techniques to generate the two coherent baseband frequencies separated by 1 MHz, and then uses up-conversion to increase the separation to 30 MHz. This technique also makes it practical to use the current state-of-the-art SDR technology, since clock frequencies are limited to well below the 30 MHz carrier frequencies used here. Adaptive digital predistortion techniques are used to equalize the magnitudes of the two frequencies by using feedback to calibrate for the compensation needed. Such then eliminates the expense of using low distortion power amplifiers and flat frequency response antennas.

The radar 100 comprises a software defined radio (SDR) 102 with an analog up-converter 104, a transmitting antenna 106, a receiving antenna 108, and an analog downconverter 110. The measured range to a buried reflector 112 is "R". Antennas are in air 114, the reflector is in a solid material like earth soil/rock 116, and an interface between 118 returns a strong near field echo 120. A single Tx/Rx antenna could be used if a directional coupler were included to separate the Rx from the Tx signal for the receiver.

Each transmitted signal is defined as $S_{tx} = \cos(\omega t)$, and the received signal is defined as $S_{rx} = \cos(\omega(t-\tau))$, where, $$\tau = \frac{2R}{C},$$

"R" is the distance to the reflector, and "C" is the speed of propagation in the media, e.g., roughly $300 \times 10^6$ meters per second.

If two signals are transmitted, $\omega_H, \omega_L$, then the virtual carrier frequency is $$\omega_c = \frac{\omega_H + \omega_L}{2},$$

and the modulation is defined as $$\omega_m = \frac{\omega_H - \omega_L}{2}.$$

The two transmitted frequencies resemble the upper and lower sidebands of a suppressed amplitude modulated (AM) carrier. Summing together $$S_{TX}^H = \cos(\omega_H t)$$

and $$S_{TX}^L = \cos(\omega_L t)$$

produces, $S_{TX} = \cos(\omega_m t)\cos(\omega_c t)$.

Radar 100 is unique in its ability to cancel out or suppress the strong near field echo 120 while being able to increase sensitivity to a reflected signal 122. It does this by transmitting, $\omega_H, \omega_L$, as two coherent signals separated by, e.g., 30 MHz. The phase separation between the two has a wavelength of ten meters if $\omega_H - \omega_L = 30$ Mhz. Relative to antenna 106, a modulation maximum for example occurs at 2.5 meters, where buried reflector 112 is located, and a minimum occurs just near 0.1 meters where interface 118 is located. The frequency separation, $\omega_H - \omega_L$, can be increased to extend the range of detection for reflector 118, e.g., 60 Mhz extends the wavelength of the modulation seen in the demodulator to twenty meters. In the receiver, the strong near field echo 120 will be canceled in the first mixer.

The received signal will be, $S_{RX} = \cos(\omega_m(t-\tau))\cos(\omega_c(t-\tau))$. When mixed in a first mixer with $\sin \omega_m t$, the product after low-pass filtering is $\sin(107_m \tau)\cos(\omega_c(t-\tau))$. Importantly, the first term depends only delay "$\tau$" and not "t". Quadrature mixing in the down-converter 110 eliminates "t" altogether, and produces demodulated signals $\sin(\omega_m \tau)\cos(\omega_c \tau)$ and $\sin(\omega_m \tau)\sin(\omega_c \tau)$.

Applying this to the case in FIG. 1, the echo delay from interface 118 is defined as $\tau_1$ and will be near zero because Tx antenna 106 is placed very close to interface 118. And, the delay from reflector 112 is defined as $\tau_2$. So, at the SDR receiver inputs I, Q, $I = \sin(\omega_m \tau_1)\sin(\omega_c \tau_1) + \sin(\omega_m \tau_2)\sin(\omega_c \tau_2)$, and $Q = \sin(\omega_m \tau_1)\cos(\omega_c \tau_1) + \sin(\omega_m \tau_2)\cos(\omega_c \tau_2)$.

FIG. 2 is an illustration of a useful application for radar 100 in a coal mining application. Mining machines and radar antennas operate in an air atmosphere with a dielectric constant of one. A transmitting radar antenna Tx will direct a primary EM wave (Ep) toward a coal seam with a dielectric constant of four. The 1:4 contrast creates a secondary EM reflection (Esc). But most of Ep will penetrate to encounter a water interface. Water has a dielectric constant of eighty-one, for a contrast of 4:81. A strong secondary EM wave reflected from the water interface (Esw) will be returned to the receiver Rx. The thickness or depth to the water interface is very important for mine safety. If mining can be stopped when there is still an adequately thick enough wall of coal, a catastrophic flooding can be avoided. Radar 100 can measure the thickness of the coal seam.

A problem arises using one single pair of frequencies as in system 100 (FIG. 1) in that multiple targets cannot be resolved. There is also an integer ambiguity problem with the short modulation wavelength, e.g., ten meters. If a measurement indicates the target seems to return a phase and amplitude signal corresponding to an "R" of 7.5 meters, it could also be at 17.5 m, 27.5 m, etc., because there is no way to resolve between each integer wave. The solution is to send multiple pairs of frequencies all with different degrees of separation between themselves. For example, $\omega_H - \omega_L = 15$ MHz, 20 MHz, 30 MHz, 40 MHz, etc.

FIG. 3 represents a multiple target software defined radar embodiment of the present invention, and is referred to herein by the general reference numeral 300. Two pairs of frequencies $\omega_H, \omega_L$ are shown here for illustrative purposes, but practical systems will have at least five frequency pairs. A very recently introduced semiconductor device makes the coherent frequency synthesis and predistortion functions much easier.

The Analog Devices AD9959 has four direct digital synthesis (DDS) cores providing for independent frequency, phase, and amplitude control on each channel. Such is used by radar 300 to correct antenna response, filtering, power amplification, PCB layout-related mismatches, and other analog processing imbalances between signals. All the channels share a common system clock, so they are inherently synchronized. The AD9959 provides for synchronization of multiple devices, and all channels can be coherent.

The AD9959 can do 16-level modulation of frequency, phase, or amplitude (FSK, PSK, ASK). Modulation is done by applying data to the profile pins. Linear frequency, phase, or amplitude sweeps enable radar, instrumentation, and other applications.

The AD9959 serial I/O port provides for multiple configurations. The serial I/O port has an SPI-compatible mode of operation found in other Analog Device DDS products. Four data pins control four programmable modes of serial I/O operation.

The AD9959 DDS technology provides low power dissipation and high performance. It incorporates four integrated high speed 10-bit DAC's with excellent wideband and narrowband SFDR. Each channel has a dedicated 32-bit frequency tuning word, 14-bits of phase offset, and a 10-bit output scale multiplier.

The DAC outputs are supply referenced and are terminated into AVDD by a resistor, or an AVDD center-tapped transformer. Each DAC has its own programmable reference to enable different full-scale currents for each channel.

The DDS acts as a high resolution frequency divider with the REF_CLK as the input and the DAC providing the output. The REF_CLK input source is common to all channels and can be driven directly or used in combination with an integrated REF_CLK multiplier (PLL) up to a maximum of 500 MSPS. The PLL multiplication factor is programmable 4-20, in integer steps. The REF_CLK input also has an oscillator circuit to support an external 20 MHz-30 MHz crystal as the REF_CLK source.

Radar 300 comprises a quad-DDS 302, a quad mixer 304, a transmitting antenna 306, a receiving antenna 308, and an analog downconverter 310. The measured range to a buried reflector 312 is "R". Antennas 306 and 308 are in an air environment 314, the reflector is in a solid material like earth soil/rock 316, and an interface between 318 returns a strong near field echo 320. A single Tx/Rx antenna could be used if a directional coupler were included to separate the Rx from the Tx signal for the downconverter 310.

Each transmitted signal is defined as $S_{tx}=\cos(\omega t)$, and the received signal is defined as $S_{rx}=\cos(\omega(t-\tau))$, where, $$\tau = \frac{2R}{C},$$

"R" is the distance to the reflector, and "C" is the speed of propagation in the media, e.g., roughly $300 \times 10^6$ meters per second.

Four signals are transmitted, $\omega_{H1}, \omega_{L1}, \omega_{H2}, \omega_{L2}$, and the virtual carrier frequency is $$\omega_c = \frac{\omega_H + \omega_L}{2},$$

and the modulation is defined as $$\omega_{m1} = \frac{\omega_{H1} - \omega_{L1}}{2},$$

and $$\omega_{m2} = \frac{\omega_{H2} - \omega_{L2}}{2}.$$

Summing together, each $S_{TX}^H = \cos(\omega_H t)$ and $S_{TX}^L = \cos(\omega_L t)$, produce a corresponding $S_{TX} = \cos(\omega_m t)\cos(\omega_c t)$.

For example, radar 300 simultaneously transmits $\omega_{H1}, \omega_{L1}, \omega_{H2}, \omega_{L2}$, as two pairs of coherent signals separated by, e.g., 30 MHz and 45 MHz respectively. The phase separation between the two in each pair has a wavelength of ten meters and 7.5 meters. Relative to antenna 306, a modulation maximum for example occurs for the first pair at 2.5 meters, and the second pair at 1.825 meters. Simultaneous measurements for buried reflector 312 can be used to resolve wavelength integer ambiguities and arrange at a most probable solution, e.g., by paring a decision tree. As in system 100 (FIG. 1), a minimum occurs just near 0.1 meters where interface 318 is located. The frequency separation, $\omega_H - \omega_L$, can be increased to extend the range of detection for reflector 318, and several pairs of simultaneously launched transmitter signals are preferred.

The received signal will be a complex of all the reflectors returning echoes and each having a respective value "τ", e.g., $S_{RX} = \cos(\omega_m(t-\tau))\cos(\omega_c(t-\tau))$. When mixed in a first mixer with $\sin \omega_m t$, the general product after low-pass filtering is $\sin(\omega_m \tau)\cos(\omega_c(t-\tau))$. Again, the first term depends only delay "τ" and not "t". Quadrature mixing in the down-converter 310 eliminates "t" altogether, and produces demodulated signals $\sin(\omega_m \tau)\cos(\omega_c \tau)$ and $\sin(\omega_m \tau)\sin(\omega_c \tau)$.

Applying this to the case in FIG. 3, the echo delay from interface 318 is defined as $\tau_1$ and will be near zero because Tx antenna 306 is placed very close to interface 318. And, the delay from reflector 312 is defined as $\tau_2$. So, at the SDR receiver inputs I, Q, $I=\sin(\omega_m \tau_1)\sin(\omega_c \tau_1)+\sin(\omega_{m1}\tau_2)\sin(\omega_c \tau_2)+\sin(\omega_m \tau_2)\sin(\omega_c \tau_2)$, and $Q=\sin(\omega_m \tau_1)\cos(\omega_c \tau_1)+\sin(\omega_{m1}\tau_2)\cos(\omega_c \tau_2)+\sin(\omega_{m2}\tau_2)\cos(\omega_c \tau_2)$.

A prototype implementation of the present invention used a highly integrated single board digital signal processing development platform with four major functional units, a 16-bit fixed point digital signal processor (DSP) with 40-bit arithmetic logical unit (ALU), an 8-bit host microcontroller with 256K on-chip flash memory, a Xilinx field programmable gate array (FPGA), and a Bluetooth and RS-232 serial communication link.

The microcontroller is a processor optimized for control tasks using bit operations on expanded peripheral ports, and it was not efficient for calculations. DSP's are optimized for specific digital signal processing calculations with high performance. The FPGA logic device replaces tens of standard logic devices and allows changes to the peripheral hardware functionality without any changes in the hardware. The combination of these three devices allowed optimum software and hardware task distribution. The microcontroller, DSP and FPGA were combined through a host port interface (HPI) bus for data exchange between them. In such configuration, the microcontroller acts as a host processor governing DSP and FPGA. DSP acts as a high speed co-processor and FPGA acts as a reconfigurable universal interface between the board and external devices. Processing software was downloaded into the DSP internal program memory and FPGA configuration memory. All software was stored in the on-chip flash memory of microcontroller. At startup, the microcontroller downloads to the FPGA and then to the DSP. Changes to the microcontroller software, DSP program, or FPGA configuration, required only the microcontroller to be reprogrammed. The system programmable (ISP) on-chip flash memory of microcontroller could be reprogrammed through its JTAG interface, and through its serial communication link too. In application programmable (IAP) capability could reprogram the whole board remotely through wireless Bluetooth communication link. IAP represented an advantage because the device functionality could be changed quickly and easily.

Adaptive digital predistortion (DPD) offers higher efficiency and greater flexibility at a lower cost. DDS 302 (FIG. 3) includes the predistortion function if an Analog Devices AD9959 is used. Predistortion generally requires the insertion of a nonlinear module before the RF power amplifier. The nonlinear module, a predistorter, has the inverse response of the power amplifier (PA) and antenna, so the overall response is linear. Adaptive digital predistortion involves a digital implementation of the predistorter and a feedback loop for adapting to the changes in the response of the PA and antenna.

The two main types of adaptation algorithms are the "blind adaptive" algorithms based on distance-gradient methods, and the "polynomial function" algorithms that attempt to directly model the nonlinearities. The correction factors can be computed using an adaptation algorithm and can be stored in a look-up table (LUT). They are typically updated dynamically to reduce errors between the predistorter input and the Tx antenna output.

The blind adaptive LUT-based approach uses incoming samples (I and Q) with correction factors applied from a LUT and sent to a radio frequency (RF) module. The LUT's address is derived from the input power and the LUT contains two values for each location, the real part, I, and the imaginary part, Q. The feedback loop, samples of the radiated Tx signal are used to update the current values stored in the LUT.

In general, a ground-penetrating radar comprises a transmitter for launching pairs of widely separated and coherent continuous waves. Each pair is separated by a different amount, such as 10 MHz, 20 MHz, and 30 MHz. Synchronous detection methods are used to demodulate the signals reflected back, and such reflections will have phase delays compared to the phase of the original transmitted signals that will correspond to the depth from which they have been reflected. Each sideband of a reflected pair of continuous waves receives a different phase delay that is a function of the two continuous wave frequencies. The difference in phases are equivalent to modulation, and have a phase range that starts at 0-degrees at the transmitter antenna which is near the ground surface. Deep reflectors at 90-degrees and 270-degrees will be illuminated with modulation signal peaks. Quadrature detection, mixing, and down-conversion are manipulated so 0-degree and 180-degree reflections effectively dropping out in demodulation.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the "true" spirit and scope of the invention.

What is claimed is:

1. An earth penetrating radar, comprising:
a software-defined transceiver (SDT) programmed as a geologic-media penetrating radar with multi-channel direct digital synthesizer (DDS) for synthesizing many coherent first and second frequency continuous waves $\omega_{H1}, \omega_{L1}, \omega_{H2}, \omega_{L2}$, etc., as individual pairs and each member of a separated from the other member in the pair in frequency by n-MHz, m-MHz, etc.;
a feedback enabled pre-distorter for dynamically predistorting each of said pairs of first and second frequency continuous waves to account for non-linearities in following stages and antennas;
a power amplifier and antenna for launching corrected versions of said coherent pairs of said first and second frequency continuous waves into the earth and a first interface;
a receiver and antenna for collecting a relatively strong signal reflected from said first interface and substantially weaker signals reflected from deeper buried objects and interfaces of material with contrasting dielectric constants;
a down-converter and demodulator disposed in the SDT and for demodulating in-phase, $I=\sin(\omega_m\tau_1)\sin(\omega_c\tau_1)+\sin(\omega_m\tau_2)\sin(\omega_c\tau_2)$, and quadrature-phase $Q=\sin(\omega_m\tau_1)\cos(\omega_c\tau_1)+\sin(\omega_m\tau_2)\cos(\omega_c\tau_2)$ signals for each pair of transmitted first and second frequency continuous waves, wherein $\omega_m$ represents a modulation frequency, $\omega_c$ represents a virtual carrier frequency, $\tau_1$ represents the echo delay time occurring for reflections from said first interface near the antenna, and $\tau_2$ represents the echo delay time occurring for more distant reflections from buried objects and interfaces; and
a computer and display for showing a user the depth of said buried objects and interfaces by simultaneously solving for all echo delay times $\tau_2$ for each differently separated pair of first and second frequencies;
wherein, echo delay time $\tau_1$ is near zero and near reflection surface terms including it are manipulated by a configuration of constituent parts to zero out in the step of computing and displaying.

2. The radar of claim 1, further comprising:
an up and down conversion quadrature mixer for translating said first and second frequency continuous waves.

3. A radar, comprising:
means for synthesizing coherent continuous waves at first and second frequencies as pairs separated in frequency by a constant or variable n-MHz;
means for predistorting the magnitudes and phases of each of said continuous waves at first and second frequencies to account for non-linearities in following stages and antennas;
means for launching corrected versions of said coherent pairs of said continuous waves at first and second frequencies from a power amplifier and antenna into the earth through a first interface to deeper objects and interfaces of materials with contrasting dielectric constants;
means for receiving relatively weaker signals reflected from buried said deeper objects and interfaces of material with contrasting dielectric constants in the presence of relatively stronger signals reflected from said first interface;
means for demodulating any signals received to produce an in-phase $I=\sin(\omega_m\tau_1)\sin(\omega_c\tau_1)+\sin(\omega_m\tau_2)\sin(\omega_c\tau_2)$, and a quadrature phase, $Q=\sin(\omega_m\tau_1)\cos(\omega_c\tau_1)+\sin(\omega_m\tau_2)\cos(\omega_c\tau_2)$, wherein $\omega_m$ represents a modulation frequency, $\omega_c$ represents a virtual carrier frequency, $\tau_1$ represents the echo delay time that is near zero and occurring for reflections from said first interface near the antenna, and $\tau_2$ represents the echo delay time occurring for more distant reflections from buried objects and interfaces;
means for suppressing said relatively stronger signals reflected from said first interface; and
means for computing and displaying the depth of said buried objects and interfaces by solving the echo delay times $\tau_2$.

4. The radar of claim 3, further comprising:
means for up-conversion to allow the means for synthesizing to operate at lower frequencies than those radiated by the antenna.

5. A method of electronic imaging into the earth, comprising:
transmitting double-sideband, suppressed carrier signals, $\omega_c$, that comprise pairs of coherent continuous waves separated by different amounts by a modulation frequency, $\omega_m$;
coherently demodulating reflections of said double-sideband, suppressed carrier signals received from a plurality of interfaces of material near a transmitting and receiving antenna in which such materials have contrasting dielectric constants;

suppressing a strong near field echo with a delay time, $\tau_1$, in said reflections that approaches zero, wherein, quadrature detection, mixing, and down-conversion are combined so 0-degree and 180-degree reflections effectively drop out in demodulation;

preferring weaker near field echoes with delay times, $\tau_2$, in said reflections that are substantially removed from zero; and producing radar images of objects outlined by reflections from said plurality of interfaces of material with delay times, $\tau_2$.

* * * * *